United States Patent [19]

Pidgeon

[11] Patent Number: 5,035,548
[45] Date of Patent: Jul. 30, 1991

[54] HOLE SAW DRIVER AND EXTRUDER

[76] Inventor: Joseph A. Pidgeon, 2920 N. Deer Track, Tucson, Ariz. 85749

[21] Appl. No.: 606,772

[22] Filed: Oct. 31, 1990

[51] Int. Cl.$^5$ .................... B23B 51/05; B23Q 11/02
[52] U.S. Cl. .................................. 408/68; 408/204; 408/703
[58] Field of Search ............... 408/67, 68, 204, 208, 408/209, 703, 205–207, 199; 144/21, 23, 24

[56] References Cited

U.S. PATENT DOCUMENTS

| 3,647,310 | 3/1972 | Morse | 279/1 A X |
| 3,784,316 | 1/1974 | Bittern | 408/703 X |
| 4,101,238 | 7/1978 | Reibetanz et al. | 408/204 X |
| 4,148,593 | 4/1979 | Clark | 408/703 X |
| 4,741,651 | 5/1988 | Despres | 408/703 X |
| 4,968,189 | 11/1990 | Pidgeon | 408/204 X |

Primary Examiner—Steven C. Bishop

[57] ABSTRACT

A flanged irregular bushing is fitted through a corresponding irregular hole in the base of a conventional hole saw and supports a cylindrical shank which extends from the back of the hole saw. Either the bushing or the shank is internally threaded with right hand leading threads. A collar is free to reciprocate on the shank and has pins projecting through corresponding holes through the base of the hole saw into the cup of the saw. The distance by which the pins extend into the cup of the hole saw depends upon the location of the collar on the shank. When the collar is positioned away from the base of the hole saw the pins extend only a short distance into the cup of the saw, permitting the mandrel to be threaded deeply into the saw with the fingers on the end of the saw close to the saw base. Then when the collar is moved closer to the saw base the pins extend deeper into the cup of the saw, blocking revolution of the mandrel fingers in the saw so that when the mandrel is rotated in right hand direction from in back of the saw, torque is transmitted to the saw for sawing, and then when the collar is again moved away from the saw base the collar pins are withdrawn from contact with the mandrel fingers and the mandrel is free to be threaded out through the hole saw to extrude any residual sawed material from within the saw.

14 Claims, 2 Drawing Sheets

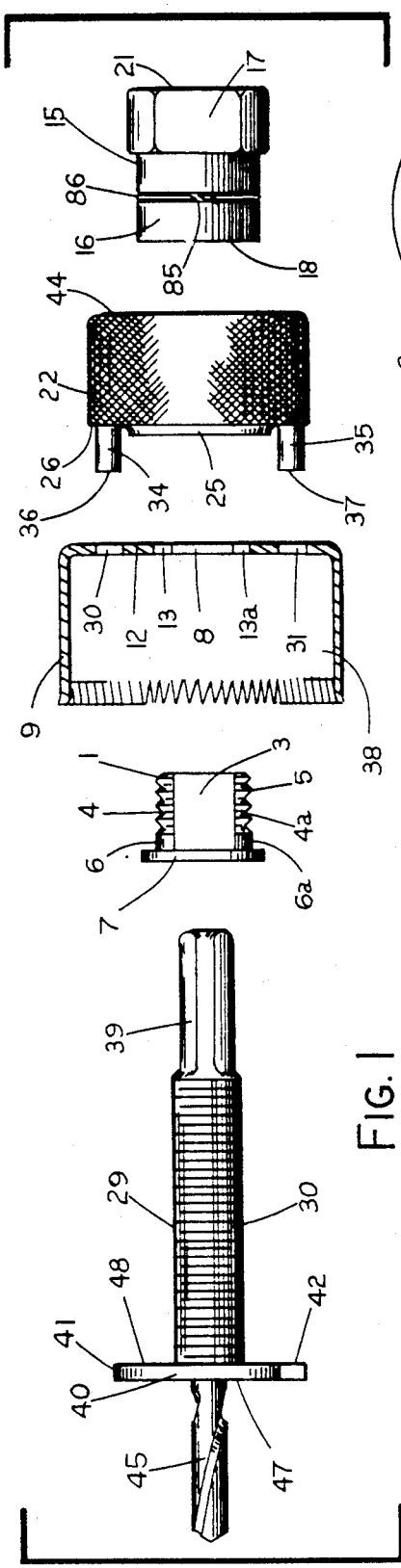
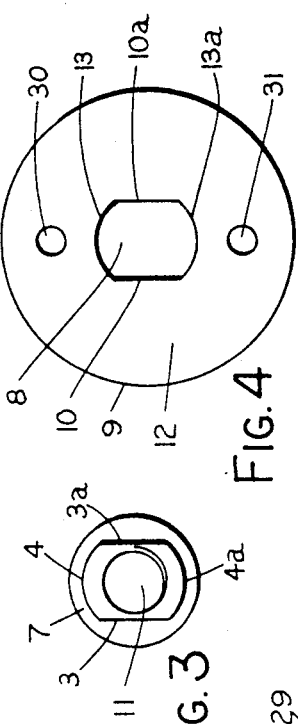
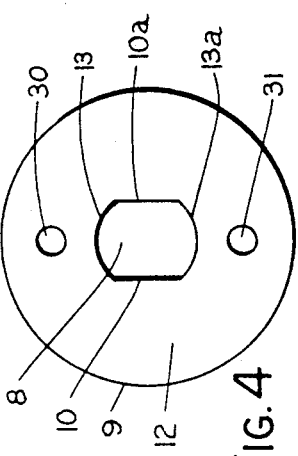
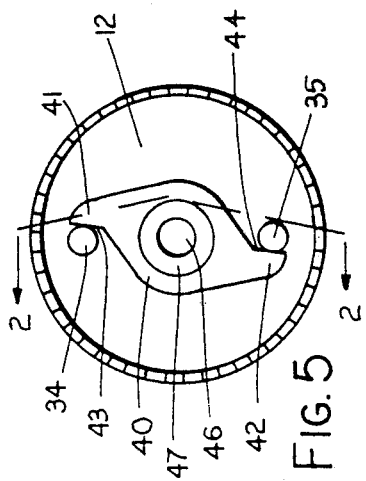
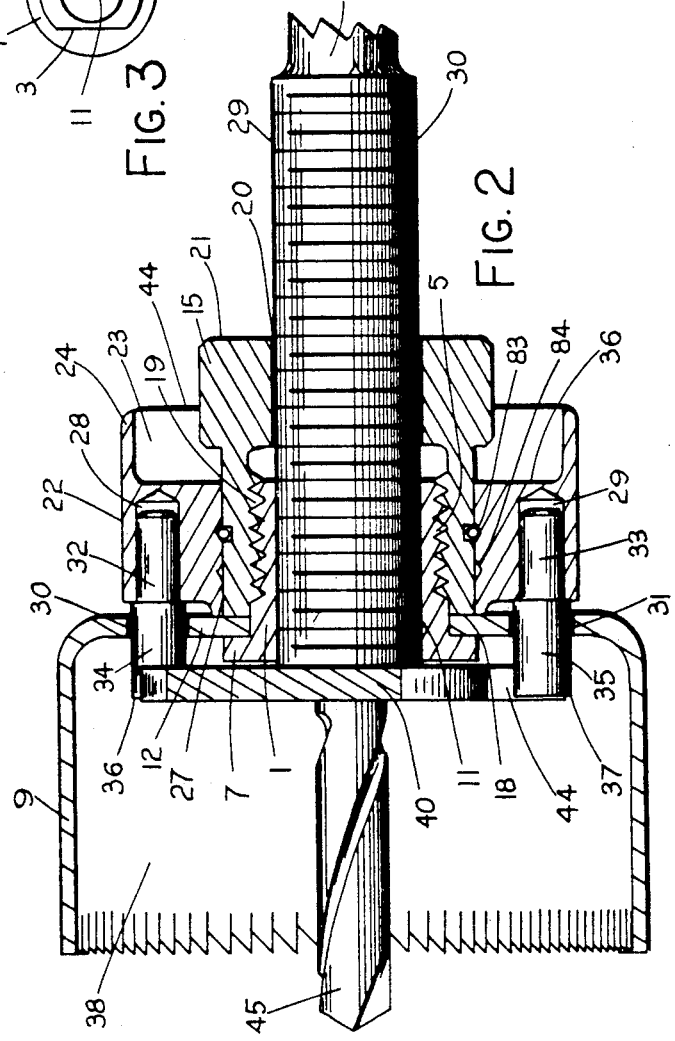

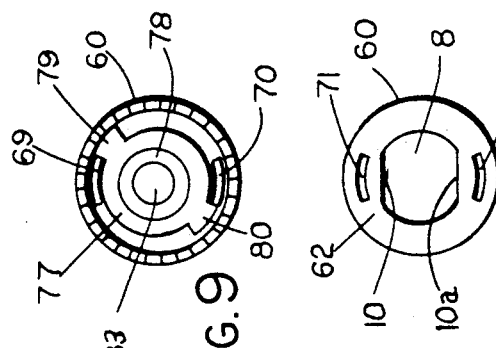
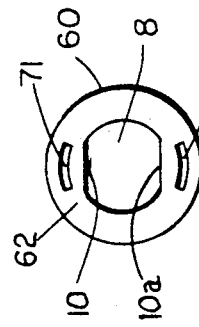
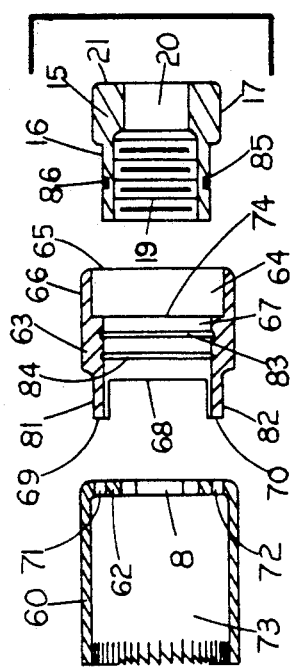
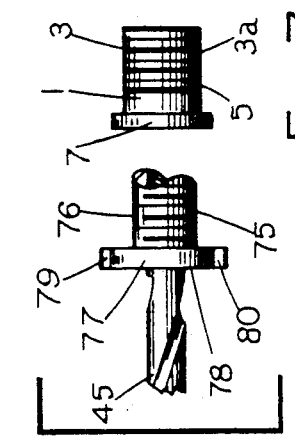
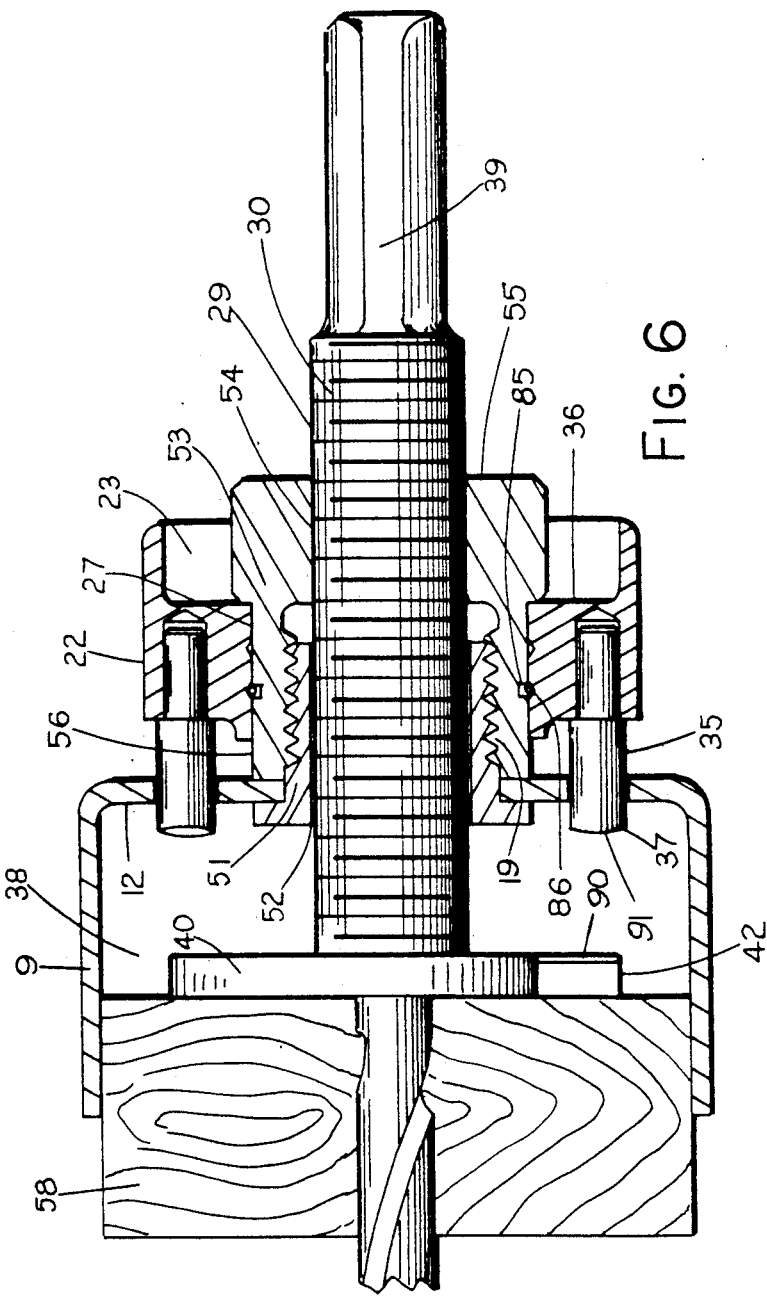

HOLE SAW DRIVER AND EXTRUDER

FIELD OF INVENTION

This invention relates to a device for driving and for extruding sawed material from that particular type of conventional hole saw which incorporates an irregular hole centrally through the base of the saw for mounting a driving mandrel and smaller holes through the base of the saw arranged around the irregular hole through which tools may be inserted to remove a disk of sawed material from within the saw after sawing.

PRIOR ART

The driving mandrel of the prior art is a one-quarter inch diameter drill bit. The bit is retained in a flanged bushing which has an irregular shoulder adjacent the flange which accurately fits the irregular hole in the saw base, and the bit is secured in the bushing by a small set screw in the irregular shoulder. The bushing forms a cylindrical threaded stub of smaller diameter than that of the shoulder and which is inserted into the irregular hole from within the hole saw with the bushing flange against the inner face of the saw base. A nut is threaded onto the bushing stub against the outer face of the saw base, locking the bushing and the bit in the saw. The bit point extends slightly beyond the cutting end of the saw and the bit shank extends from the back of the saw for coupling to a drill chuck. Sawing torque is limited to the gripping power of the drill chuck and the small set screw on the one-quarter inch diameter drill bit.

After sawing, the disk confined in the saw on the drill bit is removed by pushing any available tool through the small holes. Because the holes are not centered in the saw base, the pushing force cants the disk, binding it against the saw wall and the drill bit, requiring pushing alternately through the holes to work the disk from the saw. This manual operation is very time consuming and is complicated by the saw being too hot from the friction of sawing to be manipulated without proper gloves.

A hole saw driving and extruding device invented by this inventor and which has some similarities to the subject of this invention is disclosed in patent application No. 07/426,060, now U.S. Pat. No. 4,968,189. That device has no utility with the type of conventional hole saw to which this invention is directed, but has similar subject matter without which the device of this invention would be inoperative.

SUMMARY OF THE INVENTION

In the device of this invention, torque for sawing is transferred to the saw by fingers extending radially from the end of the mandrel inside the saw working against retractable pins inserted through the openings around the irregular hole in the saw base, rather than by the coupling formed by the irregular bushing in the irregular hole in the saw base.

A flanged internally right hand threaded irregular bushing having external threads is inserted through the irregular hole in the saw base with the bushing flange against the inner face of the saw base. The external threads are not continuous, in that the portions of the bushing having the least radial dimensions do not carry a thread, thus permitting a relatively large threaded hole through the bushing while maintaining a sufficient cross-sectional area for the stresses to which the bushing is subjected. A flanged shank threaded onto the irregular bushing against the outer face of the saw base carries a collar free to reciprocate on the shank between the saw base and the shank flange. Pins project from the collar through the openings in the saw base into the saw, the depth to which the pins extend into the saw depending upon the position of the collar on the shank.

A threaded mandrel adapted to engage the internally threaded bushing is inserted shank first into the saw and threaded into the bushing. The mandrel has fingers extending radially from the end of the mandrel inside the saw, which are arranged around the mandrel such that the fingers simultaneously contact the pins extending into the saw when the pins intersect the helical paths defined by the fingers as the mandrel is threaded into or out of the bushing. The mandrel can be as large as one-half inch in diameter and the mandrel fingers, the pins projecting into the saw, and the openings through the saw base are capable of transferring a very large amount of torque as compared with the one-quarter inch diameter drill bit secured by only a small set screw in the irregular bushing of the conventional hole saw, which forms the conventional driving mandrel.

In operation, with the collar positioned away from the saw base against the shank flange such that the collar pins extend into the hole saw only slightly beyond the flange of the bushing, the mandrel is threaded into the bushing until the mandrel fingers are stopped against the collar pins and the base of the fingers is not permitted to bind against the face of the bushing flange such that the fingered end of the mandrel will not resist being started away from the flange. The collar is then moved on the shank to rest against the saw base, the collar pins being moved farther into the hole saw such that when the mandrel is rotated in right hand direction, as for sawing, the leading faces of the fingers work against the pins to transfer torque from the mandrel to the saw for sawing.

After sawing, when a disk of sawed material is confined in the saw and impaled on the pilot drill, the collar is moved to rest against the shank flange and the pins are withdrawn from contact with the mandrel fingers, permitting the mandrel to cooperate with the threaded bushing to be threaded out through the hole saw for the fingered end of the mandrel to extrude the disk of material from the saw where it may be easily removed from the pilot drill which is retained in the fingered end of the mandrel.

In a modified form of the device, the flanged end of the shank is internally right hand threaded to cooperate with the mandrel and the hole through the bushing is an unthreaded clearance hole to accomodate the mandrel.

DESCRIPTION OF THE DRAWINGS

FIG. 1, is an exploded view illustrating a conventional hole saw and the components of the invention.

FIG. 2, is a sectional view of the assembled device of the invention through section line 2—2 of FIG. 5.

FIG. 3, is an end view of the irregular bushing of the invention.

FIG. 4, illustrates the outer base end of a conventional hole saw.

FIG. 5, is a view of the cutting end of the hole saw with the mandrel threaded into the irregular bushing and with the mandrel fingers in contact with the collar pins in sawing mode.

FIG. 6, is a sectional view of a modified device having a threaded hole in the flanged end of the shank for cooperating with the mandrel.

FIG. 7, is an exploded view of the device of the invention modified to work with hole saws of small diameter.

FIG. 8, shows the base of a modified small hole saw.

FIG. 9, shows a modified mandrel in the open end of a small saw.

FIG. 10, is a threaded drill for engaging the threaded mandrel end.

DETAILED DESCRIPTION OF THE INVENTION

As shown in FIG. 1, an exploded view, the device of the invention consists of four basic components: bushing 1, shank 15, collar 22 and mandrel 29, which are assembled together with conventional hole saw 9, as shown in FIG. 2.

Referring to FIGS. 1 and 3, bushing 1 has opposite flat sides 3 and 3a, opposite circular portions 4 and 4a, and circular flange 7. Circular portions 4 and 4a carry external threads 5, leaving short sections 6 and 6a adjacent flange 7 unthreaded. Right hand threaded hole 11 is formed axially through bushing 1. Shank 15 has cylindrical body 16 and hexagonal flange 17. Internal threads 19 (FIG. 2) are formed axially in end 18 of shank 15 to engage threads 5 on bushing 1. Hole 20 through end 21 of shank 15 opens into the larger diameter threads 19 and closely fits the threaded body 30 of mandrel 29.

Referring to FIGS. 1 and 2, collar 22, preferably knurled, has bore 27 which closely fits the cylindrical body 16 of shank 15. Counterbore 23 formed in end 44 of collar 22 forms skirt 24 and bottom surface 36. Circular boss 25 is formed on end 26 of collar 22 around bore 27 to reduce the area of contact and tranfer of heat from saw base 12. Holes 28 and 29 are formed in end 26 of collar 22 to retain shanks 32 and 33 of pins 34 and 35, respectively, and are located to conform with locations of holes 30 and 31 in saw base 12, such that pins 34 and 35 are able to simultaneously enter through holes 30 and 31 in saw base 12.

Mandrel 29 has elongated threaded body 30 adapted to engage internally right hand threaded hole 11 in bushing 1 and forms shank 39 of smaller diameter for coupling to a drill chuck. Finger plate 40 is threaded to engage threaded body 30 of mandrel 29 and is threaded flush onto end 47 of mandrel 29, preferably brazed in position. Referring to FIGS. 1, 2 and 5, fingers 41 and 42 on finger plate 40 are arranged to simultaneously contact collar pins 34 and 35 when mandrel 29 is threaded into bushing I. End 47 (FIG. 5) of mandrel 29 contains axially formed hole 46 in which pilot drill 45 is preferably brazed at the time finger plate 40 is brazed to mandrel 29. Alternately, pilot drill 45 may be threaded into mandrel 29 to be easily removed or replaced, as is later described.

Referring to FIG. 4, conventional hole saw 9 has irregular hole 8 formed centrally through saw base 12. Hole 8 forms opposite flat sides 10 and 10a and opposite circular portions 13 and 13a. In FIGS. 1 and 3, sides 3 and 3a and unthreaded sections 6 and 6a of circular portions 4 and 4a of bushing 1 are formed to accurately fit into irregular hole 8 in saw base 12. Access holes 30 and 31 through saw base 12 of conventional hole saw 9 are equidistant from the center of saw base 12.

Referring to FIG. 2, bushing 1 is inserted through cup 38 of hole saw 9 into irregular hole 8 (FIG. 4) of saw base 12 with flange 7 of bushing 1 rested against saw base 12. Collar 22 is mounted on shank 15 with pins 34 and 35 facing opposite shank flange 17. Shank 15 is then threaded onto bushing 1 while pins 34 and 35 are guided into holes 30 and 31 in saw base 12, such that saw base 12 is tightly retained between flange 7 of bushing 1 and end 18 of shank 15, and such that bushing 1, shank 15 and collar 22 are concentrically attached to saw base 12.

Shank 39 of mandrel 29 is inserted through cup 38 of hole saw 9 and through bushing 1. Threaded body 30 of mandrel 29 is threaded into hole 11 in bushing 1. It is important that the lengths of collar pins 34 and 35 be determined such that when shank 15 is tightened against saw base 12 on bushing 1 and collar 22 is moved on shank body 16 such that counterbore bottom surface 36 is rested against shank flange 17, ends 36 and 37 of pins 34 and 35 extend into cup 38 of hole saw 9 slightly beyond flange 7 of bushing 1, as shown in FIG. 6, for the purpose that when mandrel 29 is threaded into bushing 1, fingers 41 and 42 will be stopped against pins 34 and 35 before face 48 of finger plate 40 can bind against bushing flang 7 and cause difficulty for mandrel 29 to be started out through bushing 1 when the driver-extruder is in sawing mode. For example only, if mandrel 29 and bushing 1 are threaded ¼" UNC (13 threads per inch), finger plate 40 will advance into cup 38 of hole saw 9 approximately 0.038" in each ½ revolution of mandrel 29 as mandrel 29 is threaded into bushing 1, such that pin ends 36 and 37 would need to extend into cup 38 slightly more than 0.038" beyond bushing flange 7 to insure that fingers 41 and 42 would be stopped against pins 34 and 35 before face 48 of finger plate 40 came into contact with bushing flange 7.

Referring to FIG. 1, if the inside face surfaces 88 and 89 of mandrel fingers 41 and 42 are in the same plane as face surface 48 of finger plate 40, and if ends 36 and 37 of collar pins 34 and 35 are finished perpendicular to the axes of pins 34 and 35, it would be possible for the inside surfaces 88 and 89 of fingers 41 and 42 to be coincidentally brought against ends 36 and 37 of pins 34 and 35 when mandrel 29 is threaded into bushing 1, causing fingers 41 and 42 to bind against pin ends 36 and 37, jamming collar 22 against shank flange 17 and making it impossible for pins 34 and 35 to be moved into cup 38 of hole saw 9 in the sawing mode. It is impractical to index thread starts on a mandrel and in a bushing, and to index the locations of fingers on a mandrel to avoid such interference on interchangeable parts.

For that reason, mandrel fingers 41 and 42 are twisted slightly out of the plane of finger plate 40, or they may be so machined, such that surfaces 88 and 89 of fingers 41 and 42 form angles relative to the axis of mandrel 29 slightly larger than the helix angle of the threads (not numbered) of mandrel body 30. Ends 36 and 37 of collar pins 34 and 35 are likewise formed at angles relative to the axis of collar 22 slightly larger than the helix angle of the threaded mandrel body 30. Thus, with finger surfaces 88 and 89 and pin ends 36 and 37 so angularly formed, fingers 41 and 42 will pass freely over pin ends 36 and 37 as mandrel 29 is threaded into bushing 1 until the then leading edges (not numbered) of fingers 41 and 42 contact and are stopped against the cylindrical sides of collar pins 34 and 35.

In a similar manner, in FIG. 7, fingers 79 and 80 extending from finger plate 77, and ends 69 and 70 of collar tongues 81 and 82 form corresponding angles slightly larger than the helix angle of the threads (not numbered) of mandrel body 75.

The helix angle of a ¼" UNC thread, for example, is only approximately 2.8 degrees, which resolves to a very small dimensional increment over the widths of fingers 41 and 42 and over the diameters of pins 34 and 35 (only about 0.004" inclination of the surfaces) and is shown greatly exaggerated in FIG. 6, as angular surface 90 on mandrel finger 42 and by curved periphery 91 on end 37 of collar pin 35. The angles are important, however, to avoid undesireable interference.

After mandrel 29 is threaded into bushing 1 and fingers 41 and 42 are stopped against pins 34 and 35, collar 22 may be moved on shank body 16 such that boss 25 rests against saw base 12 and such that pins 34 and 35 extend sufficiently into cup 38 of hole saw 9 to block right hand rotation of mandrel 29 relative to hole saw 9 by faces 43 and 44 of fingers 41 and 42 impinging upon collar pins 34 and 35 and then thereafter during right hand rotation of mandrel 29 torque is transferred from mandrel 29 through fingers 41 and 42 to pins 34 and 35 and to the sides of holes 30 and 31 of saw base 12 to impart right hand rotation of hole saw 9 for sawing.

Conversely, after sawing and when a plug of sawed material is confined within the cup 38 of hole saw 9 and impaled on pilot drill 45, collar 22 may be moved against hexagonal flange 17 on shank body 16 such that collar pins 34 and 35 are withdrawn from contact with fingers 41 and 42 such as to free finger plate 40 and mandrel 29 to rotate in cup 38 of hole saw 9 and to allow threaded body 30 of mandrel 29 to cooperate with threaded hole 11 of bushing 1 for mandrel 29 to be threaded out through cup 38 of saw 9 for end 47 of mandrel 29 and finger plate 40 to extrude sawed material from cup 38 of hole saw 9.

Referring to FIG. 6, bushing 51 in hole saw 9 is a modification of previously described bushing 1. Clearance hole 52 formed axially through bushing 51 closely fits threaded body 30 of mandrel 29, replacing threaded hole 11 of bushing 1. Shank 53 is a modification of shank 15, previously described. Threaded hole 54 through end 55 of modified shank 53 is adapted to engage threaded body 30 of mandrel 29, and replaces clearance hole 20 in end 21 of shank 15, such that threaded hole 54 cooperates with shank body 30 for the function of extruding sawed material from cup 38 of saw 9.

Conventional hole saws of the type which utilize the irregular hole 8 in saw base 12 (FIG. 4) and which are of small diameter, do not incorporate openings through their bases for access to remove sawed material because there is little space available in the very small saws, and because the chuck of the driving drill would impede the passage of a tool into the openings. Slots are therefore formed through the sides of the small saws to accomodate a pushing or prying device. Referring to FIGS. 7, 8 and 9, collar 63 is devised in order that the concept of the invention may be utilized with small hole saws in cooperation with openings 71 and 72 in base 62 of small hole saw 60. Bushing 1 is inserted through cup 73 of saw 60 into irregular hole 8 in saw base 62. Counterbore 64 in end 65 of collar 63 is placed over cylindrical body 16 of shank 15 and bore 67 of collar 63 is fitted onto shank body 16 with the bottom surface 74 of counterbore 64 rested against hexagonal shank flange 17. Shank threads 19 are threaded onto threads 5 of bushing 1 and shank 15 is tightened against saw base 62. During the threading of shank 15 onto bushing 1, circular tongues 81 and 82, formed on boss 68 of collar 63 are led into circular slots 71 and 72 in saw base 62. The lengths by which tongues 81 and 82 extend from boss 68 are determined such that when shank 15 is tight against saw base 62 and bottom face 74 of counterbore 64 is rested against shank flange 17, ends 69 and 70 of tongues 81 and 82 extend into cup 73 of saw 60 slightly beyond flange 7 of bushing 1 for the purpose previously described.

Mandrel 76 has right hand threaded body 75. Finger plate 77 is axially threaded to engage mandrel body 75 and is threaded flush onto end 78 of mandrel 76 and is preferably brazed onto mandrel 76 in that position. The diameter of circular finger plate 77 is slightly smaller than that of the circle on which the inside surfaces (not numbered) of tongues 81 and 82 are formed. Fingers 79 and 80 extend radially from finger plate 77, arranged to simultaneously contact tongues 81 and 82 when mandrel 76 is fully threaded into bushing 1. The outside diameter defined by the fingers 79 and 80 coincides with the diameter of the circle on which the outer surfaces (not numbered) of tongues 81 and 82 are formed. The shank end of mandrel 76 (not shown) is inserted through cup 73 of saw 60 and bushing 1, and mandrel body 75 is threaded into bushing 1 until fingers 79 and 80 are stopped against tongues 81 and 82. Collar 63 is moved on shank 15 such that boss 68 rests against saw base 62, tongues 81 and 82 being moved into cup 73 of saw 60 sufficiently to block right hand rotation of fingers 79 and 80 to tranfer torque for sawing during right hand rotation of mandrel 76 and for finger plate 77 to extrude sawed material when collar 63 is moved against shank flange 15 as has been previously described.

Shank 15 (FIGS. 1 and 7) and shank 53 (FIG. 6) contain annular slots 85 formed circumferentially into cylindrical bodies 16 and 56, respectively. An annular split spring coil 86, having a free diameter slightly larger than the diameter of shank bodies 16 and 56 is retained in slots 85. The bore 27 of collar 22 (FIG. 2) and the bore 67 of collar 63 (FIG. 7) have annular detent grooves 83 and 84 located and spaced apart such that spring 86 expands into detent groove 84 to maintain collars 22 and 63 against shank flange 17 during the extruding cycle of the device, and such that spring 86 expands into detent groove 83 to maintain collars 22 and 63 in optimum position on shank 15 during the sawing cycle described.

Conventional hole saws of the configuration to which the device of this invention is adaptable do not ordinarily have a great depth of sawing capacity, being only approximately one inch deep. Therefore, it is important that the thickness of finger plates 40 and 77 (FIGS. 1 and 7) be kept as thin as practical for the strength of the material used commensurate with the sawing torque of the driving drill, for the effective sawing depth of the saws not to be adversely reduced. Mandrel finger plates 40 (FIG. 1) and 77 (FIG. 7) are too thin to accept tapped holes for set screws with which to secure pilot drill 45 in mandrel ends 47 (FIG. 5) and 78 (FIG. 9) and pilot drill 45 is therefore preferred to be brazed into holes 46 and 83 of mandrels 29 and 76, respectively. However, as illustrated in FIG. 10, pilot drill 45 may have a threaded shank 87 and holes 46 and 83 in mandrels 29 and 76 may be threaded to accept threaded shank 87 of pilot drill 45 for drill 45 to be removable from mandrels 29 and 76.

It will be understood that the device described herein represents the best imbodiment of the invention in the mind of the inventor, and that variations in the design or structure of the invention may be made without departing from the basic principle of the invention.

Having thus described and illustrated the device of this invention in such detailed and explicit manner that those persons skilled in the art may, within the scope of the following claims, practice the invention otherwise than as specifically illustrated and described herein, that which I claim is:

1. A device for driving and extruding sawed material from a hole saw, which saw has an irregular hole formed centrally through the base thereof and openings through the base around the irregular hole, comprising:
   (a) an irregular flanged bushing formed to fit into said irregular hole and to maintain the bushing hole concentric with said saw, having external threads concentric with said bushing hole formed on at least portions thereof, and said bushing being inserted into said irregular hole with the flange thereof being rested against the inner face of said saw base;
   (b) a flanged cylindrical shank having a threaded hole axially in the unflanged end thereof adapted to engage the threads on said bushing, a smaller hole axially through the flanged end thereof into said threaded hole, said shank being threaded onto said bushing against said saw base;
   (c) threaded means for supporting a right hand threaded mandrel axially in said bushing and shank and for cooperating with said threaded mandrel;
   (d) a collar freely mounted on said shank for reciprocating thereon and having projections extending equidistantly therefrom through said openings into said saw, the ends of said projections formed to define portions of helixes around the axis of said collar through said ends having the helical direction and at least as large pitch as has said threaded means; and
   (e) an elongated right hand threaded mandrel engaged in said threaded means, said mandrel having a shank of smaller diameter on the end thereof extending from the flanged end of said shank, drive means extending radially from the opposite end thereof in the saw arranged to interpose and to be stopped against the sides of said projections in said saw upon said drive means being helically advanced close to said bushing flange, the surfaces of said drive means toward the shank end of said mandrel being equidistant from said opposite end of said mandrel along the axis thereof and being formed such as to define portions of helixes around the axis of said mandrel through said surfaces having the helical direction and at least as large pitch as has the thread of said mandrel; whereby, with said collar rested against said shank flange, said mandrel being threaded shank end forward in said threaded means until said drive means are stopped against said projections, said collar being moved on said shank to rest against said saw base, said projections thereby being moved sufficiently into said saw to intersect the helical paths defined by said drive means upon said drive means being helically advanced close to said bushing flange and such that said drive means contact and work against said projections to transfer torque for sawing from said mandrel to said saw during right hand rotation of said mandrel shank, and whereby, with said collar being moved on said shank to rest against said shank flange, said mandrel being free to cooperate with said threaded means to be threaded out through said saw for said opposite end thereof to extrude sawed material from within said saw.

2. The device of claim 1, wherein said threaded means comprises right hand threads in said bushing hole adapted to engage said threaded mandrel.

3. The device of claim 1, wherein said threaded means comprises right hand threads in said smaller hole formed axially through said flanged end of said shank adapted to engage said threaded mandrel.

4. The device of claim 1, wherein said drive means on said opposite end of said mandrel is comprised of fingers extending radially from a plate rigidly attached to said opposite end of said mandrel.

5. The device of claim 1, wherein the lengths of said projections extending from said collar are determined such that when said collar is rested against said shank flange said projections extend into said saw only sufficiently beyond said flange of said bushing that said drive means contact said projections slightly before said drive means would otherwise first contact said bushing flange when said mandrel is threaded shank forward into said threaded means.

6. The device of claim 1, wherein said projections are pins retained in said collar.

7. The device of claim 1, wherein said projections extending from said collar are irregularly formed to conform with irregular openings through the base of said saw around said irregular hole formed centrally through said saw base.

8. The device of claim 1, wherein said collar further comprises more than one part fastened together and wherein said projections are formed from one of said parts.

9. The device of claim 1, wherein said flange formed on said cylindrical shank is hexagonal.

10. The device of claim 1, further comprising a hole formed axially into said opposite end of said mandrel for retaining the shank of a pilot drill.

11. The device of claim 10, further comprising a pilot drill retained in said axially formed hole in said opposite end of said mandrel by brazing.

12. The device of claim 10, wherein said axially formed hole in said opposite end of said mandrel further contains right hand threads.

13. The device of claim 12, further comprising a pilot drill having a threaded shank threaded tightly into said right hand threads in said opposite end of said mandrel.

14. The device of claim 1, further comprising an external annular slot formed circumferentially into said cylindrical shank, an open annular spring having a free diameter slightly larger than the diameter of said cylindrical shank retained in said slot, and annular grooves formed circumferentially in the bore of said collar located therein such that said grooves may cooperate with said annular spring to nominally maintain said collar in optimum positions on said shank for said mandrel to drive said saw or to extrude sawed material from said saw.

* * * * *